(12) United States Patent
Aragon (10) Patent No.: US 8,594,606 B2
(45) Date of Patent: *Nov. 26, 2013

(54) SMOOTHING FILTER FOR IRREGULAR UPDATE INTERVALS

(75) Inventor: David B. Aragon, Berkeley, CA (US)

(73) Assignee: Trapeze Networks, Inc., Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/437,673

(22) Filed: Apr. 2, 2012

(65) Prior Publication Data

US 2012/0190320 A1    Jul. 26, 2012

Related U.S. Application Data

(63) Continuation of application No. 12/057,904, filed on Mar. 28, 2008, now Pat. No. 8,150,357.

(51) Int. Cl.
*H04B 1/10* (2006.01)
*H04B 17/00* (2006.01)

(52) U.S. Cl.
USPC ......... 455/307; 455/213; 455/226.2; 455/134

(58) Field of Classification Search
USPC ........... 455/226.2, 130, 134, 137, 186.1, 213, 455/226.1, 277.2, 286, 293, 307, 306, 339
See application file for complete search history.

(56) References Cited

U.S. PATENT DOCUMENTS

| | | | |
|---|---|---|---|
| 6,650,912 B2 * | 11/2003 | Chen et al. | 455/574 |
| 6,721,548 B1 * | 4/2004 | Mohindra et al. | 455/234.1 |
| 2010/0271188 A1 * | 10/2010 | Nysen | 340/10.41 |

* cited by examiner

*Primary Examiner* — Pablo Tran (57) ABSTRACT

A technique for determining a received signal strength from multiple messages filters noise from the received signal to provide an accurate signal strength value. Advantageously, the more accurate output signal strength value can be used to identify movement of a station as well as estimate locations and direction of movement.

20 Claims, 11 Drawing Sheets

SMOOTHING FILTER FOR IRREGULAR UPDATE INTERVALS

CROSS REFERENCE TO RELATED APPLICATION

This application is a continuation of U.S. application Ser. No. 12/057,904, entitled "SMOOTHING FILTER FOR IRREGULAR UPDATE INTERVALS," filed Mar. 28, 2008, which is incorporated herein by reference in its entirety.

BACKGROUND

In radio transmissions signal attenuation through a medium such as air, a wall, or water, reduces amplitude and intensity of the signal. At a receiver the signal has an associated strength, or received signal strength, that is typically less than the signal strength at a transmitter.

Radio signal strengths are used for various purposes, such as estimating a distance of a wireless station on a network. However, signal strength measurements are subject to considerable variance, even between consecutive messages from the same transmitter. The variance creates inaccuracies in client distance estimates. In wireless networking, it is not uncommon for a signal to vary by as much as +/−0.6 decibels confounding attempts to pin down locations, or providing the appearance of sporadic movement of a non-moving transmitter.

Further compounding the issue is the irregularity of sent messages. A station need not send messages at consistent intervals. Existing systems are commonly based on systems that sample signal strength at discrete intervals. As a irregularly transmitted signal does not have a discrete sample rate, prior systems are limited in their ability to estimate distance, motion and/or location of a station on a wireless network.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for determining a received signal strength value includes filtering noise from the received signal to provide an accurate signal strength value. One or more signals including a first sample and a second sample are transmitted from a transmitter to a receiver. The receiver provides values to a dynamically windowed filter. The dynamically windowed filter receives, as an input, a received signal strength value of the second sample, a dynamic time window, and a elapsed time value representing the amount of time that has passed between the receipt of the first sample and the second sample. The dynamically windowed filter weights the received signal strength value of the first sample to obtain a weighted input signal strength value. The dynamically windowed filter decays a previous output signal strength value to obtain a decayed input signal strength value. The dynamically windowed filter and adds the weighted input signal strength value to the decayed previous output signal strength value to obtain a filter output. The weighting can be a function of the dynamic time window and the time elapsed value. The technique dramatically reduces noise through filtering. Advantageously, the more accurate output signal strength can be used to identify movement or estimate distance, direction of movement, and/or current location of a station.

These and other advantages will become apparent to those skilled in the relevant art upon a reading of the following descriptions and a study of the several examples of the drawings.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
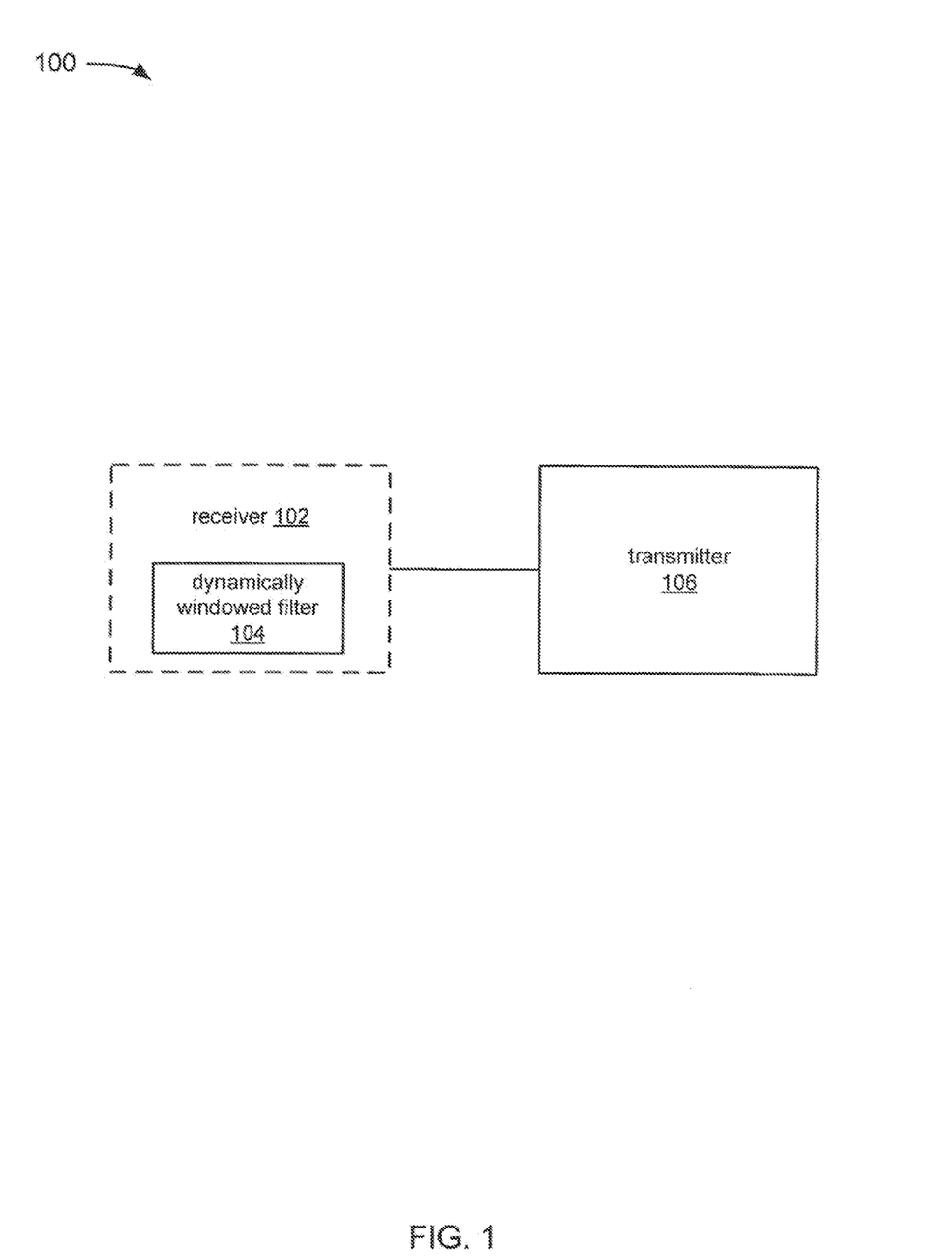
FIG. 1 depicts an example of a system for filtering noise from an irregularly received signal through a dynamically windowed filter.

FIG. 1 depicts an example of a system for filtering noise from an irregularly received signal through a dynamically windowed filter. FIG. 1 includes a receiver 102 and a transmitter 106. The receiver includes dynamically windowed filter 104.

In the example of FIG. 1, the receiver 102 can be practically any devices operable to receive a signal by radio transmission, and the transmitter 106 can be practically any device operable to transmit a signal by radio transmission. The dynamically windowed filter 104 includes include a processor and memory, such as a memory adapted to store time values, instructions and received signal strength values. The processor and the memory can be shared with the receiver 102. Alternately the dynamically windowed filter 104 can include its own processor and memory, such as on a daughter card connected to a mainboard of the receiver 102.

In the example of FIG. 1, in operation, a dynamic time window is allocated. The window can be set in seconds, milliseconds, nanoseconds, or on any known or convenient scale. Signals in the window will be considered in the filtering calculations, however, signals received too far in the past will be outside the window and will have decayed in prior calculations.

In the example of FIG. 1, in operation, two or more transmissions occur from the transmitter 106 to the receiver 102. A first sample is received at a first time and a second sample is received at a second time. A first time value is recorded at the time that the first sample is received and a second time value is recorded at a time that the second sample is received. The difference between the first time and the second time is recorded as a time elapsed value. Receiving the second sample can start a filtering process to produce an output signal strength value, or a value that has been filtered.

In the example of FIG. 1, in operation, the first sample is associated with a first sample signal strength that is recorded as a first sample signal strength value. Where prior calculations have been performed, the first sample signal strength value is associated with a previous output signal strength value. Where no prior calculations have been performed, the previous output signal strength value is initialized to a value, e.g. 0, 1.0, or any known or convenient initialization value. The second sample signal strength value is associated with a second sample signal strength and is used as an input to the dynamically windowed filter.

In the example of FIG. 1, in operation, the dynamically windowed filter 104 decays the previous output signal strength value to find a decayed previous output signal strength value. The filter weights the second sample signal strength value to find a weighted second sample signal strength value. The filter adds the decayed previous output signal strength value to the second sample signal strength value to find a current output signal strength value. The current output signal strength value is the output of the dynamically windowed filter.

In a non-limiting example, $(1-e^{-t/\tau})$ can be used to weight the second sample strength value, and $(e^{-t/\tau})$ can be used to weight the previous output signal strength value. The weights assigned herein can be calculated using one or more formulas, and can be adjusted as is known or convenient to suit a particular application.

In a non-limiting example, the receiver 102 could be a part of an ad hoc network, or alternatively, the receiver could a part of a an 802.11 infrastructure network. In the context of an infrastructure network, the receiver 102, can be included in an authorization unit (AUTH), and the transmitter 106 can be included in a station, for example, a laptop computing device, a desktop computing device, a hand held computing device, or any other known or convenient device.

Figure 2:
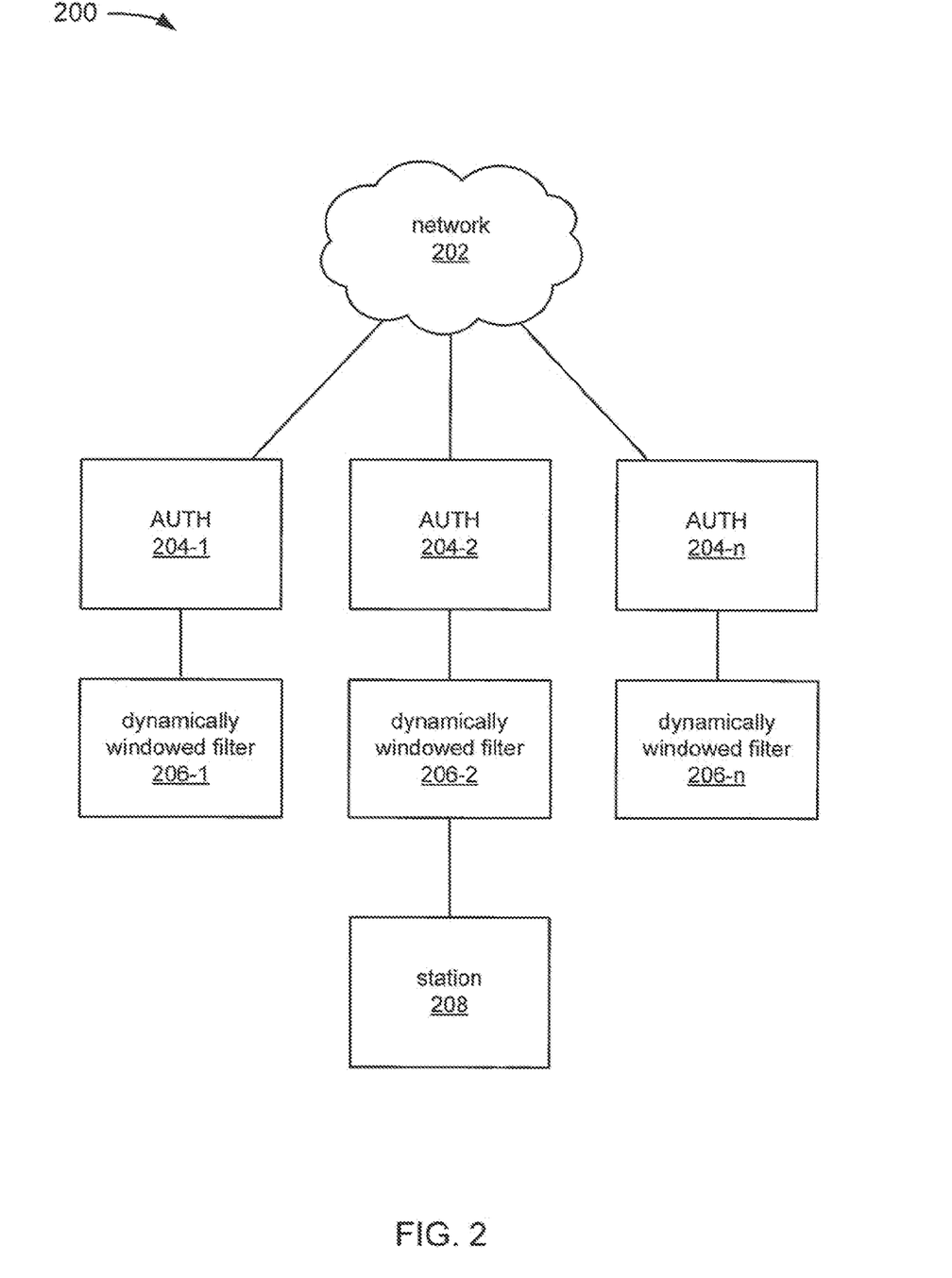
FIG. 2 depicts an example of a wireless network receiving messages at an irregular rate from a wireless station ("station") and dynamically filtering the signal through a dynamically windowed filter.

FIG. 2 depicts an example of a wireless network receiving messages at an irregular rate from a wireless station ("station") and dynamically filtering the signal through a dynamically windowed filter. FIG. 2 includes optional network 202, AUTH 204-1, AUTH 204-2, AUTH 204-n (collectively AUTHs 204), dynamically windowed filter 206-1, dynamically windowed filter 206-2, dynamically windowed filter 206-n (dynamically windowed filters 206), and station 208. As depicted for clarity, AUTHs 204 are coupled to dynamically windowed filters 206, however, AUTHs 204 could include dynamically windowed filters 206.

In the example of FIG. 2, the network 202 couples AUTHs 204. The network 202 can be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 2, AUTHs 204 are hardware units acting as communication nodes by linking wireless mobile stations such as personal computers (PCs) to controller 202 via dynamically windowed filters 206. The AUTHs 204 may generally perform authentication operations to associate stations. In an example, the AUTHs 204 connect users to other users, and may serve as a point of connection to a wired network. An AUTH includes a radio. In a non-limiting embodiment, the radio is configured for 802.11 standard transmissions.

In the example of FIG. 2, the AUTHs 204 communicate as peer-entities including distributed intelligence otherwise included in a controller. The distributed intelligence could be equivalent to that of a controller across the distributed AUTHs. Where a controller is used, the controller oversees the network and monitors connections of stations to AUTHs and can monitor location and movement of stations relative to AUTHs.

In the example of FIG. 2, the AUTHs 204-2 is coupled to the dynamically windowed filter 206-2. The dynamically windowed filter 206-2 can include its own processor and memory.

In the example of FIG. 2, the station 208 can be any computing device capable of wireless local area network (WLAN) communication. The station 208 is depicted as associated with AUTH 204-2, however, the station could associate with any one of the AUTHs 204. As associated with AUTHs 204-2, the station 208 can transmit signals to the AUTH 204-2 and the dynamically windowed filter 206-2 can filter the received signals.

In the example of FIG. 2, in operation, the station 208 transmits one or more messages to the AUTH 204-2. Each message is encoded as a wireless signal. A second to last signal received at the AUTH 204-2 can be referred to as a first sample. The first sample is received at a first time and has an associated signal strength value. The dynamically windowed filter 206-2 has a previous output signal strength value, such as from previous calculations or from initialization (where no prior calculations have been performed, the previous output signal strength value is initialized to a value, e.g. 0, 1.0, or any known or convenient initialization value).

In the example of FIG. 2, in operation, the station 208 transmits a second sample. The filter 206 determines an elapsed time value capturing an amount of time elapsed between the receipt of the first sample and the receipt of the second sample. The filter 206 weights the previous output signal strength value and the second sample signal strength value. Then the filter 206 adds the weighted previous output signal strength value to the weighted second sample signal strength value to find a current output signal strength value.

Figure 3:
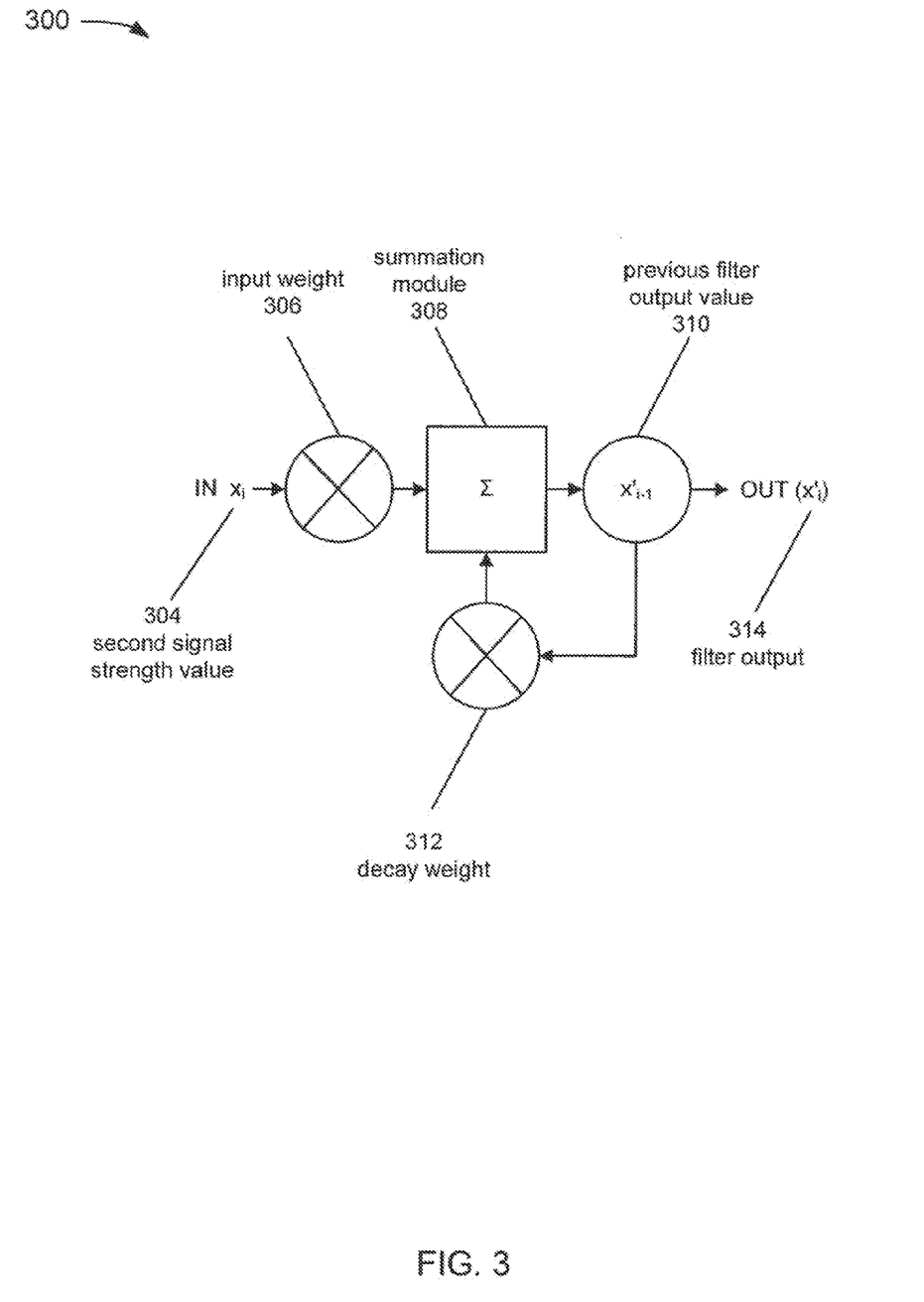
FIG. 3 depicts an example of a filter including an input, an output and weights.

FIG. 3 depicts an example of a filter 300 including an input, an output and weights. FIG. 3 includes $x_i$ (second sample signal strength value) 304, input weight 306, summation ($\Sigma$) module 308, $x'_{i-1}$(previous filter output value) 310, decay weight 312, and filter output 314.

In the example of FIG. 3, the second sample signal strength value 304 is a recorded value. The input weight 306 can include $1-e^{-t/\tau}$, where $\tau$ is the dynamic time window and t is the elapsed time value.

In the example of FIG. 3, the summation module 308 can be an addition module, such as a hardware adding machine, or in software as instructions executing on a processor to perform an addition function.

In the example of FIG. 3, the previous filter output value 310 is a value storing the previous output of the filter 310. Where no previous output of the filter has been determined, the previous filter output value 310 is initialized to an initialization value such as 0, 0.5, a pre-determined constant value, or any other known or convenient value.

In the example of FIG. 3, the decay weight 312 can include $e^{-t/\tau}$ where t is the elapsed time value discussed in reference to current signal strength weight 306 and $\tau$ is the dynamical time window discussed in reference to the input weight 306.

In the example of FIG. 3, the filter output 314 is a value that has been filtered by a dynamically windowed filter.

In the example of FIG. 3, in operation, a second sample signal strength value 304 is multiplied by the input weight which can include $[1-e^{-t/\tau}]$. The previous filter output value 310 is multiplied by the decay weight 312 to find a decayed previous output signal strength value. The summation module 308 adds the decayed previous output signal strength value to the weighted second sample signal strength value 304 to find a current filter output value. Then, the current filter output value is stored in the previous filter output value 310 for use in a subsequent calculation.

Figure 4:
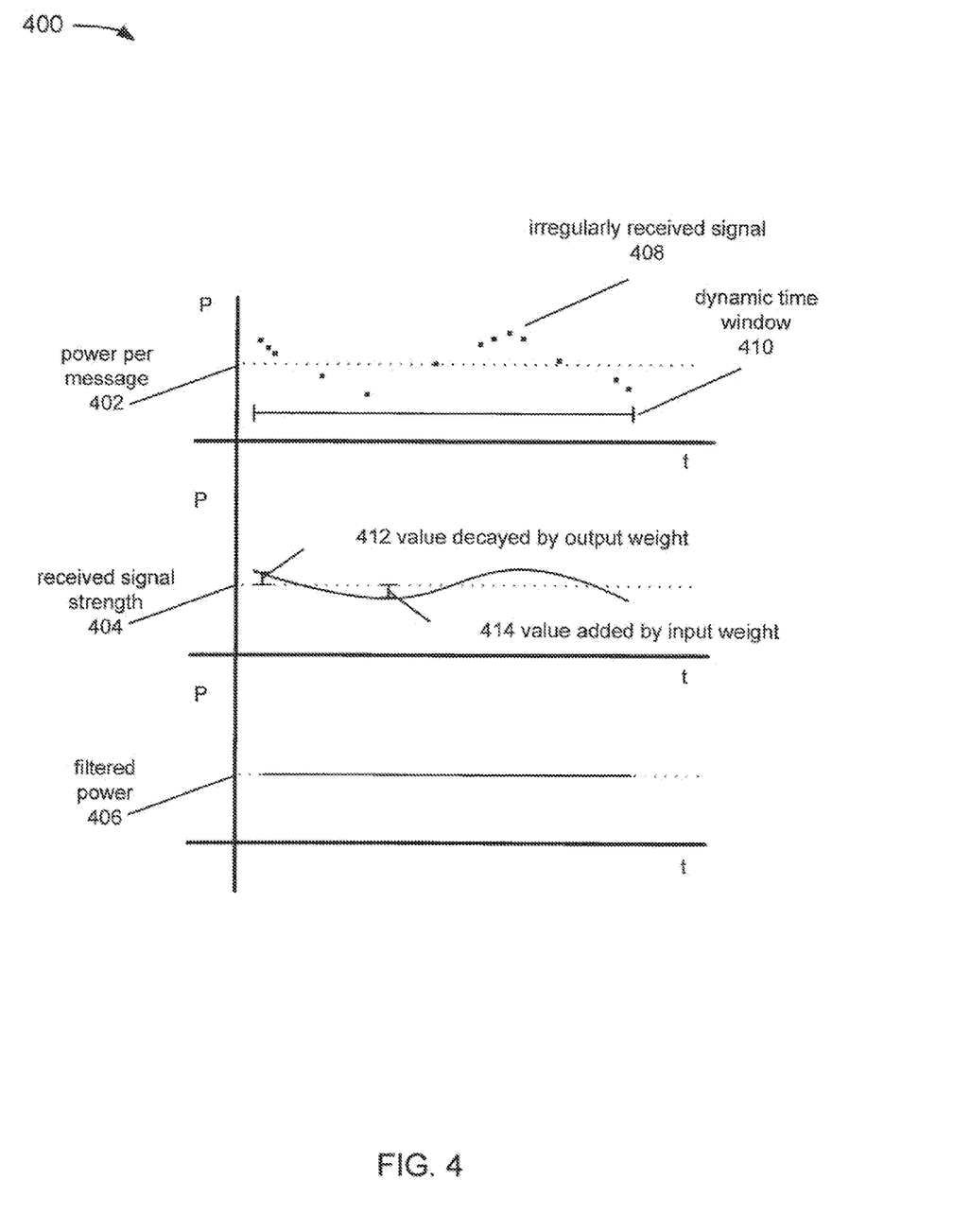
FIG. 4 depicts a diagram of an example of a plurality of graphs of sampled signal power, received signal strength, and filtered power output by a dynamically windowed filter.

FIG. 4 depicts a diagram of an example of a plurality of graphs of sampled signal power, received signal strength, and filtered power output by a dynamically windowed filter. FIG. 4 includes power per message 402, received signal strength 404, and filtered power 406. Power per message 402 includes irregularly received signal 408 and dynamic time window 410. Received signal strength 404 includes value decayed by output weight 412 and value added by input weight 414. In the example of FIG. 4, a station transmitting signals is not moving, and variation in signal power is attributed to noise on the signal.

Power per message 402 includes a number of points in irregularly received signal 408 representing signal strength values collected at various points in time. Some points cluster together indicating rapid transmission, but other points spread apart indicating less frequent transmission. The dynamic time window 410 indicates a time window over which to filter, such as 1 second, 100 milliseconds, 10 milliseconds, or on any known or convenient time scale.

The received signal strength 404 indicates a graph of signal strength to time without filtering. Such a graph could be found by interpolation, average, or any known or convenient manner. Value decayed by output weight 412 indicates a positive displacement that is attributable to noise, e.g. +6 db, and value added by input weight 414 indicates a negative displacement that is also attributable to noise, e.g. −6 db. The filtered power 406 includes a single value derived by dynamically filtering the points included in power per message 402 through the exemplary dynamic time window 410. Noise is removed.

Figure 5:
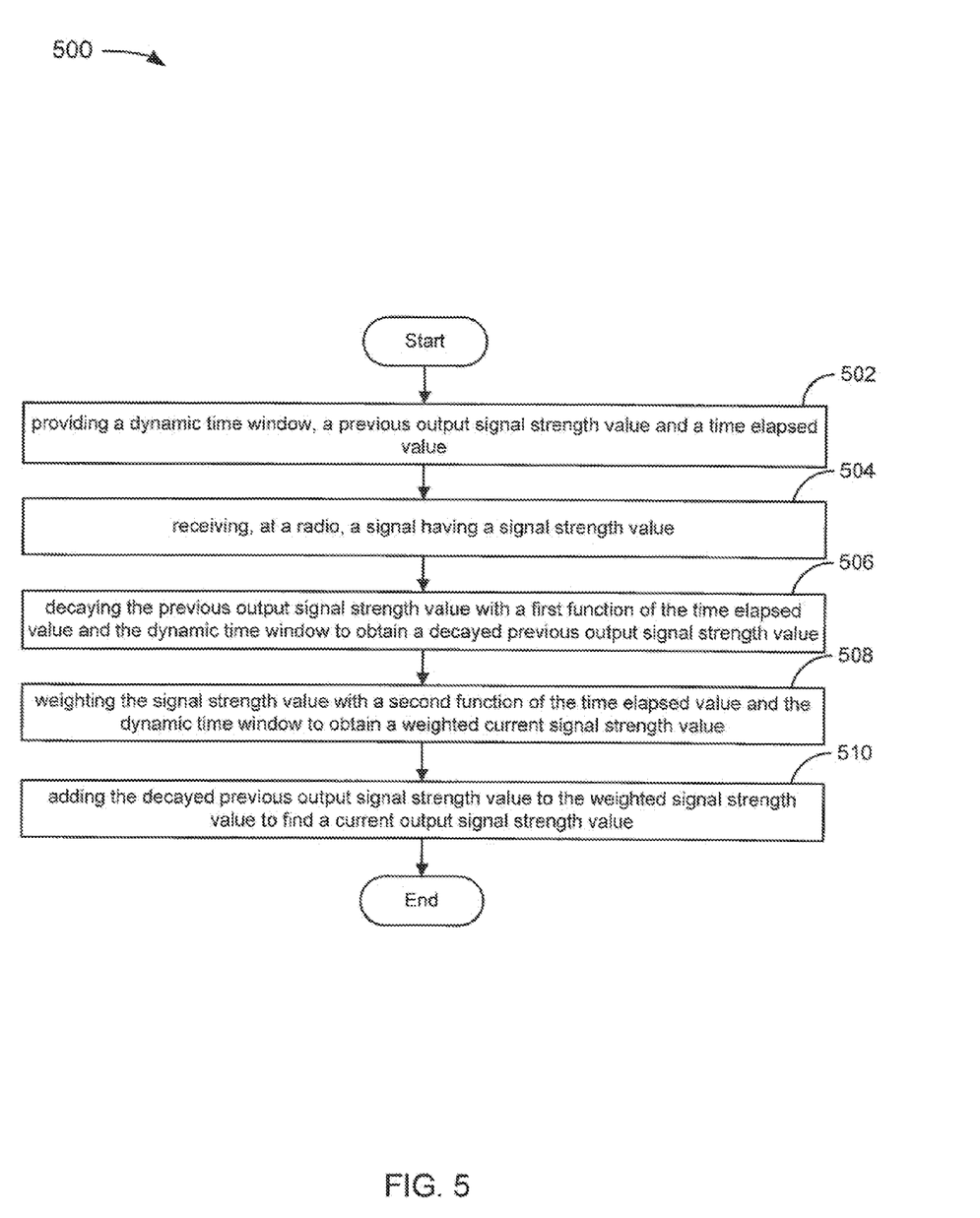
FIG. 5 depicts a flowchart of an example of a method for finding an output signal strength value using a dynamically windowed filter.

FIG. 5 depicts a flowchart of an example of a method for finding an output signal strength value using a dynamically windowed filter. The method is organized as a sequence of modules in the flowchart 500. However, it should be understood that these and other modules associated with other methods described herein may be reordered for parallel execution or into different sequences of modules.

In the example of FIG. 5, the flowchart begins at module 502 with providing a dynamic time window, a previous output signal strength value and a time elapsed value. If a first sample was received, or other prior calculations have been made, the previous output signal strength value is defined as the previous output of the filter based on a calculation using the first sample. If the previous output signal strength value is undefined, the previous output signal strength value can be set to a value of 0, a pre-defined numerical constant, or any known or convenient initialization value. The time elapsed value is a value representing the time that has passed since the receipt of a first sample.

In the example of FIG. 5, the flowchart continues to module 504 with receiving, at a radio, a signal having a signal strength value. The signal strength value is stored and the time elapsed value is set to the difference in time between the receipt of a first sample and receipt of the current signal. If no first sample was received, the time elapsed value is set to a value indicating the amount of time that the filter has been operating up to a maximum of the dynamic time window.

In the example of FIG. 5, the flowchart continues to module 506 with decaying the previous output signal strength value with a first function of the time elapsed value and the dynamic time window to obtain a decayed previous output signal strength value. The previous output signal strength value can be weighted by multiplying by a function of, e.g., $e^{-t/\tau}$. The function can include parameters for the dynamically allocated time constant value and the elapsed time. The result is the weighted previous output value.

In the example of FIG. 5, the flowchart continues to module 508 with weighting the signal strength value with a second function of the time elapsed value and the dynamic time window to obtain a weighted current signal strength value. The function can be expressed as $1-e^{-t/\tau}$ and the dynamically allocated time constant value. The result is a weighted signal strength value.

In the example of FIG. 5, the flowchart continues to module 510 with adding the decayed previous output signal strength value to the weighted signal strength value to find a current output signal strength value. Together the weighted output signal strength value and the weighted signal strength value produce the current output signal strength value. The current output signal strength value can be saved as a previous output signal strength value for future calculations. Having found a current output signal strength value, the flowchart terminates.

Figure 6:
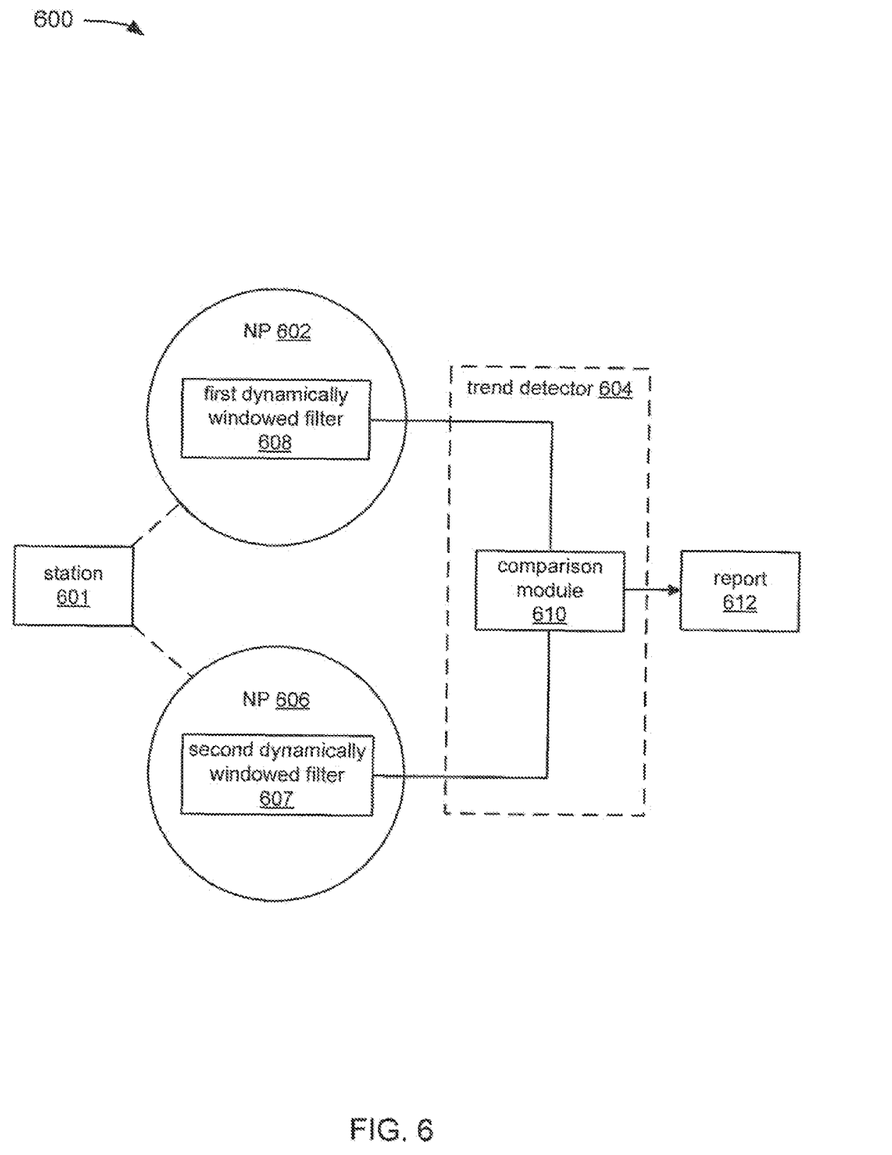
FIG. 6 depicts an example of a system for monitoring movement of a station.

FIG. 6 depicts an example of a system for monitoring movement of a station. FIG. 6 includes station 601, NP 602, trend detector 604, NP 606, and report 612. The NP 602 includes first dynamically windowed filter 608. Trend detector 604 includes comparison module 610. NP 606 includes second filter dynamically windowed filter 607. In the example of FIG. 6, NP 602 and NP 606 are coupled to the trend detector 604, such as by one or more networking units connected by, e.g., wired interface.

In the example of FIG. 2, the station 601 can be any computing device capable of wireless local area network (WLAN) communication.

NP 602 and NP 606 are hardware units acting as communication nodes by linking wireless mobile stations such as laptop personal computers to trend detector 604. First dynamically windowed filter 608 and second dynamically windowed filter 607 each determine current output signal strengths from irregularly received signals of one or more wireless stations in range of both NP 602 and NP 606.

Report 612 includes information about the station 601, such as direction of movement and can be data displayed to an administrator, saved to a log, or otherwise used or saved.

For the station 601, signal strengths increase as the wireless station approaches an NP. Where the signal strength is stronger at a first NP, than at a second NP, the station is closer to the NP having the stronger signal strength. Relative differences between the filter output signal strengths at the NP 602 and the NP 606 can be used to identify the direction of motion of a station.

In the example of FIG. 6, in operation, the comparison module 610 receives signal strengths of the station 601 in range of the NP 602 and/or the NP 606. The signal strength of the station 601 varies as the station moves closer or farther away. The comparison module 610 monitors the changing signal strengths and determines a direction of movement of the station relative to the NP 602 and the NP 606.

Figure 7:
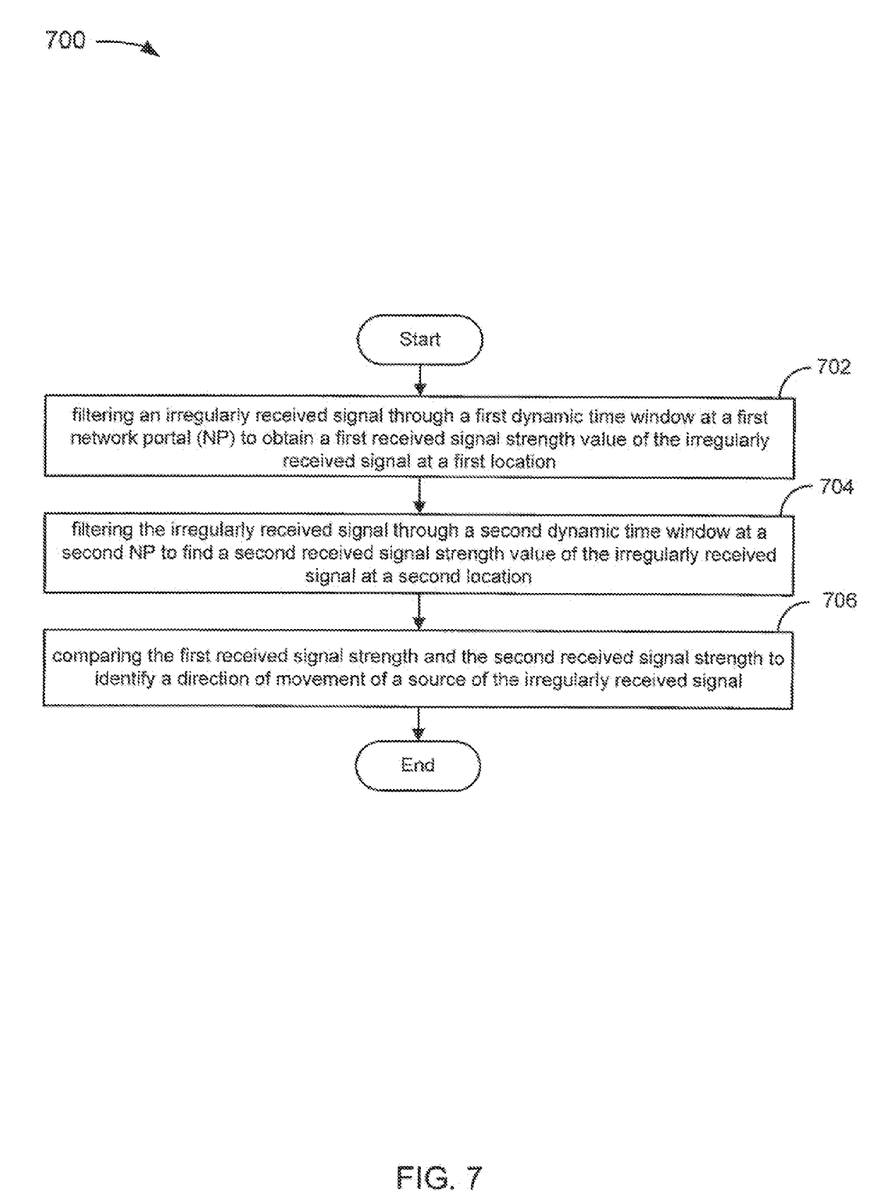
FIG. 7 depicts an example of a flowchart of a method for monitoring movement of a station.

FIG. 7 depicts an example of a flowchart 700 of a method for monitoring movement of a station. The method is organized as a sequence of modules in the flowchart 700. However, it should be understood that these and other modules associated with other methods described herein may be reordered for parallel execution or into different sequences of modules.

In the example of FIG. 7, the flowchart starts at module 702 with filtering an irregularly received signal through a first dynamic time window at a first network portal (NP) to obtain a first received signal strength value of the irregularly received signal at a first location. A station transmits messages to the first NP at irregular times, thus the signal is irregularly received. Each messages is associated with a signal having a signal strength value. The filter assigns weights to a previous output signal strength value and a current signal strength value and adds the weighted previous output signal strength and the weighted current signal strength to obtain a filter output. The weights include a function of a time elapsed value and a first dynamically allocated time constant. The output can be the first received signal strength.

In the example of FIG. 7, the flowchart continues to module 704 with filtering the irregularly received signal through a second dynamic time window at a second NP to find a second received signal strength value of the irregularly received signal at a second location. The irregularly received signal at the second NP is filtered in the same manner as the first NP however, the second NP can use the same time constant as the first NP, or a different time constant from the first NP.

In the example of FIG. 7, the flowchart continues to module 706 with comparing the first received signal strength and the second received signal strength to identify a direction of movement of a source of the irregularly received signal. Where the first NP has a stronger received signal strength than the second NP it can be said that the station is closer to the first NP than to the second NP. Over time signal strength values change as the station moves. The signal strength changes are monitored, and a direction of movement produced. Having identified the direction of movement the flowchart terminates.

Figure 8:
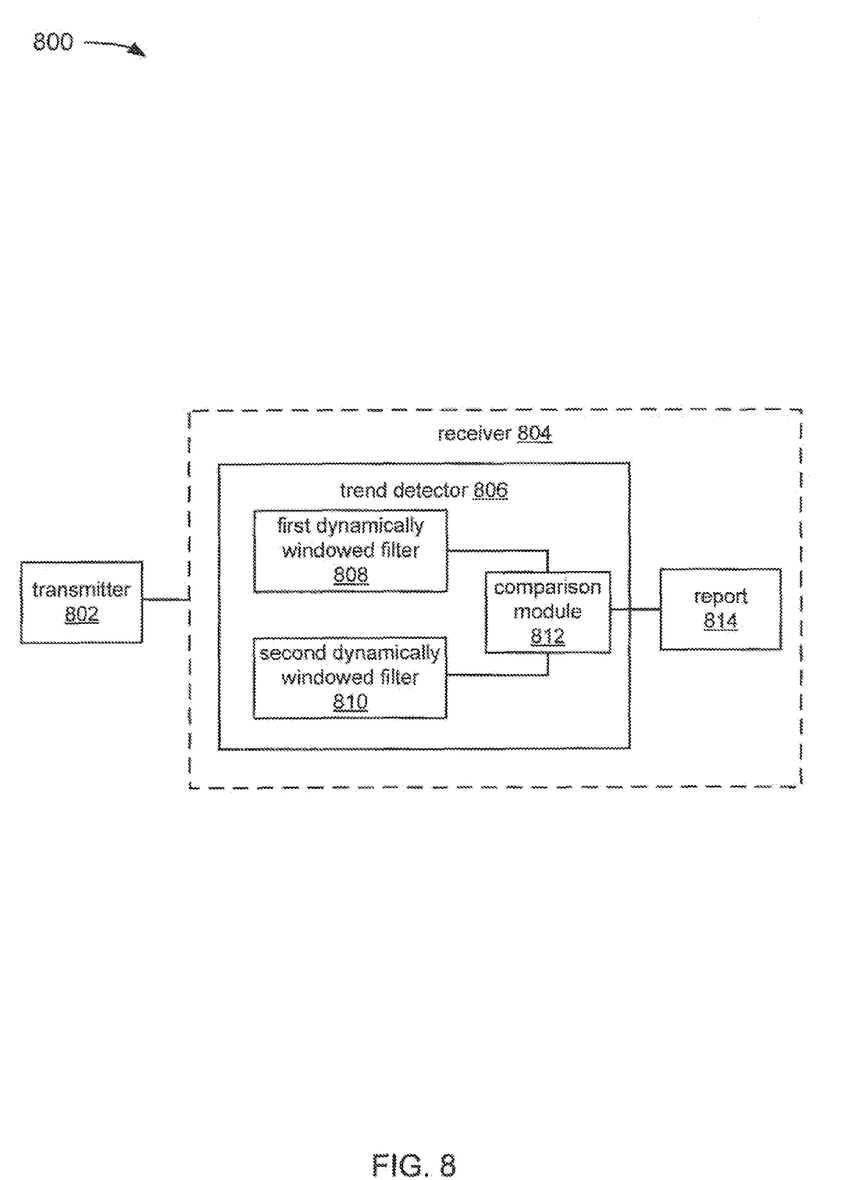
FIG. 8 depicts an example of a device for monitoring movement of a station.

FIG. 8 depicts an example of a device for monitoring movement of a station. FIG. 8 includes transmitter 802 and receiver 804. Receiver 804 includes trend detector 806 and report 814.

In the example of FIG. 8, the transmitter 802 can be practically any device operable to transmit a signal by radio transmission. The receiver 804 can be any device operable to receive a signal by radio transmission.

In the example of FIG. 8, the trend detector 806 includes first dynamically windowed filter 808, second dynamically filtered window 810 and comparison module 812. In the example of FIG. 8 the trend detector 806 is integrated into the receiver 804. The components depicted can be included on a single hardware unit, such as a motherboard, or can be constructed from one or more cards coupled to a circuit board of the receiver 804.

In the example of FIG. 8, the first dynamically windowed filter 808 has a first dynamic time window $\tau_1$ and the second dynamically windowed filter 810 has a second dynamic time window $\tau_2$. $\tau_1$ and $\tau_2$ are different so that the output of the first dynamically windowed filter 808 and the output of the second dynamically windowed filter 810 can be compared to determine whether an object is moving towards the receiver, away from the receiver, or is stationary relative to the receiver.

In a non-limiting example, where $\tau_1$ is associated with a smaller dynamic time window than $\tau_2$ and dynamically windowed filter 808 outputs a higher value than dynamically windowed filter 810, it can be estimated that the transmitter has moved closer to the receiver 804 because the signal has strengthened in the short term. The opposite could indicate that the transmitter 802 had moved farther away from the receiver 804. Where the output of dynamically windowed filter 808 equaled the output of dynamically windowed filter 810, the transmitter 802 can be said to be stationary relative to the receiver 804.

In the example of FIG. 8, information determined by comparing the output of the comparison module 812 could be used to decide whether or not to generate report 814. The trend detector 806 can be used to selectively generate more reports on transmitters with interesting trends, such as those moving rapidly toward the receiver, slowly away from the receiver, or any known or convenient trend suited for a particular application.

In the example of FIG. 8 in operation, the transmitter transmits a signal to the receiver 804 on an irregular basis. The trend detector 806 filters the signal twice, once with the first dynamically windowed filter 808 and also with the second dynamically windowed filter 810. The filter outputs are compared by the comparison module 812 to produce report 814.

Figure 9:
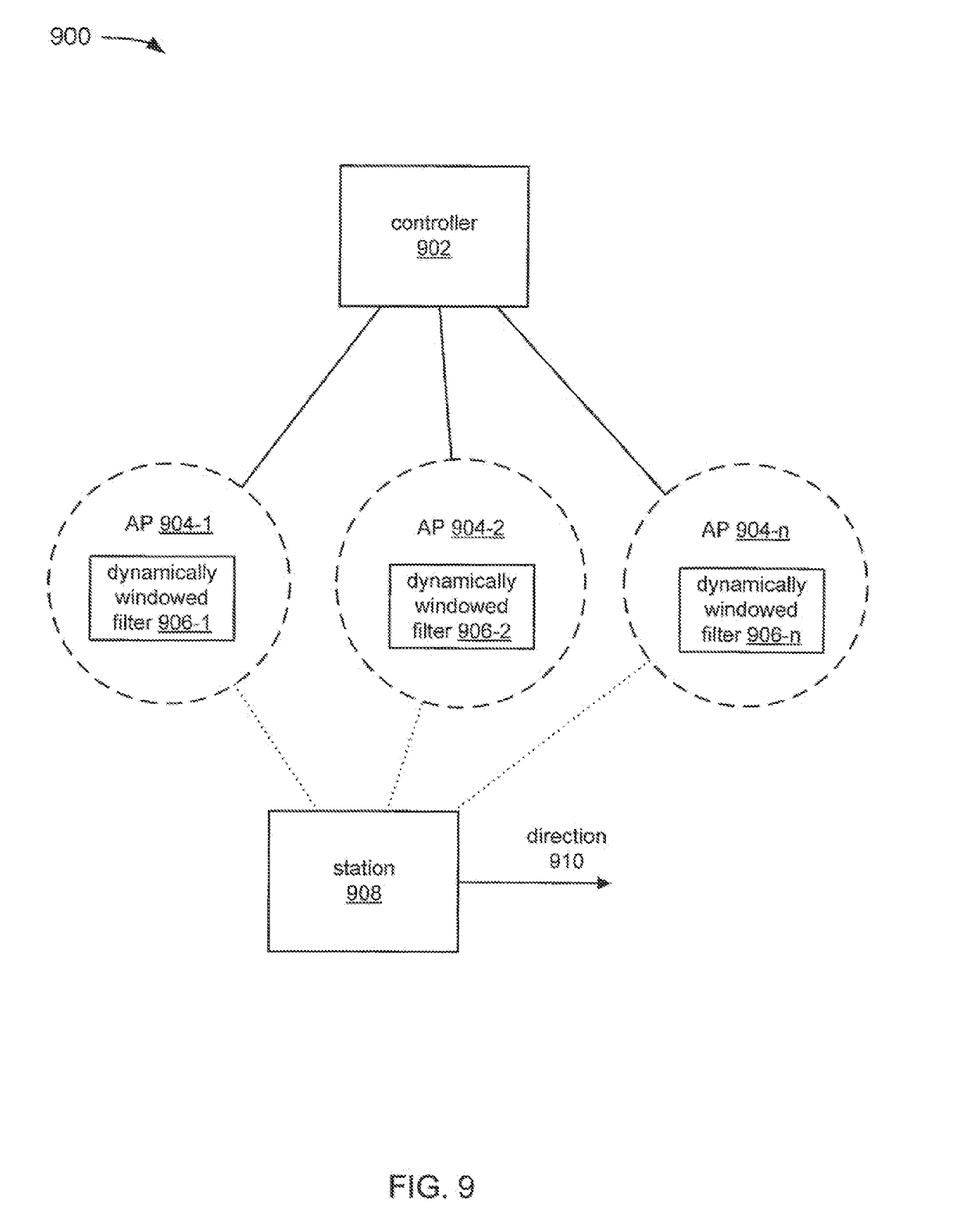
FIG. 9 depicts an example of a system for monitoring location and movement of a station using Access Points (APs).

FIG. 9 depicts an example of a system for monitoring location and movement of a station. FIG. 9 includes controller 902, Access Point (AP) 904-1, AP 904-2, AP 904-n (collectively APs 904), and station 908. AP 904-1 includes filter 906-1, AP 904-2 includes filter 906-2, and AP 904-n includes filter 906-n (collectively filters 906).

In the example of FIG. 9 the controller 902 is coupled to APs 904. The controller 902 oversees the network and monitors connections of stations to APs. The APs provide filtered signal strength values received from the APs 904 for stations in range of the APs. The controller 902 is aware of the physical location of each of APs 904. The filters 906 provide filtered signal strength values for stations in range of the APs 904.

In the example of FIG. 9 in operation, the APs 904 provide wireless network connectivity to the station 908. The station 908 moves in direction 910 while controller 902 monitors filtered signal strength outputs of the APs 904. The controller 902 interprets the filtered signal strength outputs of the APs 904 to identify a location and a direction of movement of the station 908. Advantageously, the location of the station 908 is constant as the noise in the transmitted signal is filtered.

In a non-limiting example, the direction could be identified by relating the filtered signal strength of the station to the known positions of the APs. If signal strength at both of AP 904-1 and AP 904-2 is decreasing, but stronger at AP 904-2, the station can be found to be moving to the right of AP 904-2. Specific identification of a direction, and speed can be extrapolated, for example, 1 foot/second in a direction of East.

Figure 10:
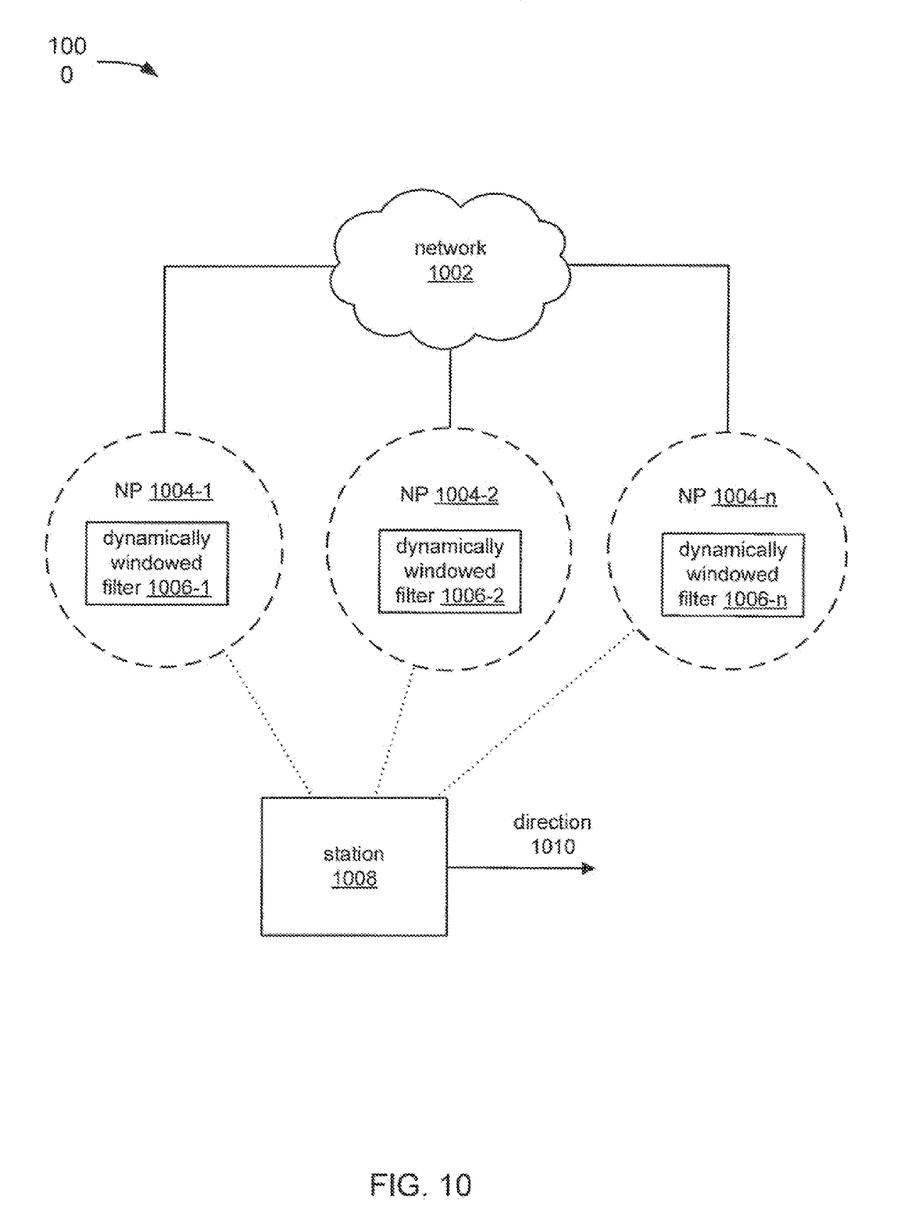
FIG. 10 depicts an example of a plurality of network portals (NPs) using dynamically windowed filters to monitor movement of a station.

FIG. 10 depicts an example of a plurality of network portals (NPs) using dynamically windowed filters to monitor movement of a station. FIG. 10 includes network 1002, NP 1004-1, NP 1004-2, NP 1004-n (collectively NPs 1004), and station 1008.

NPs 1004 include dynamically windowed filter 1006-1, dynamically windowed filter 1006-2, dynamically windowed filter 1006-n (collectively dynamically windowed filters 1006). The NPs 1004 are peer entities, that is the NPs 1004 operate together to allow access to the network 1002 and share information.

In the example of FIG. 10, the network 1002 couples NPs 1004. The network 1002 can be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 10, in operation, the station 1008 moves in direction 1010. The NPs monitor location and movement of the station by filtering received signal strength values from signals received from the station 1008. The NPs transmit filtered signal strength values to each other via network 1002. Each NP 1004 is aware of the physical location of the other NPs and is operable to obtain a direction of the station 1008 using the information received from the other NPs 1004.

Figure 11:
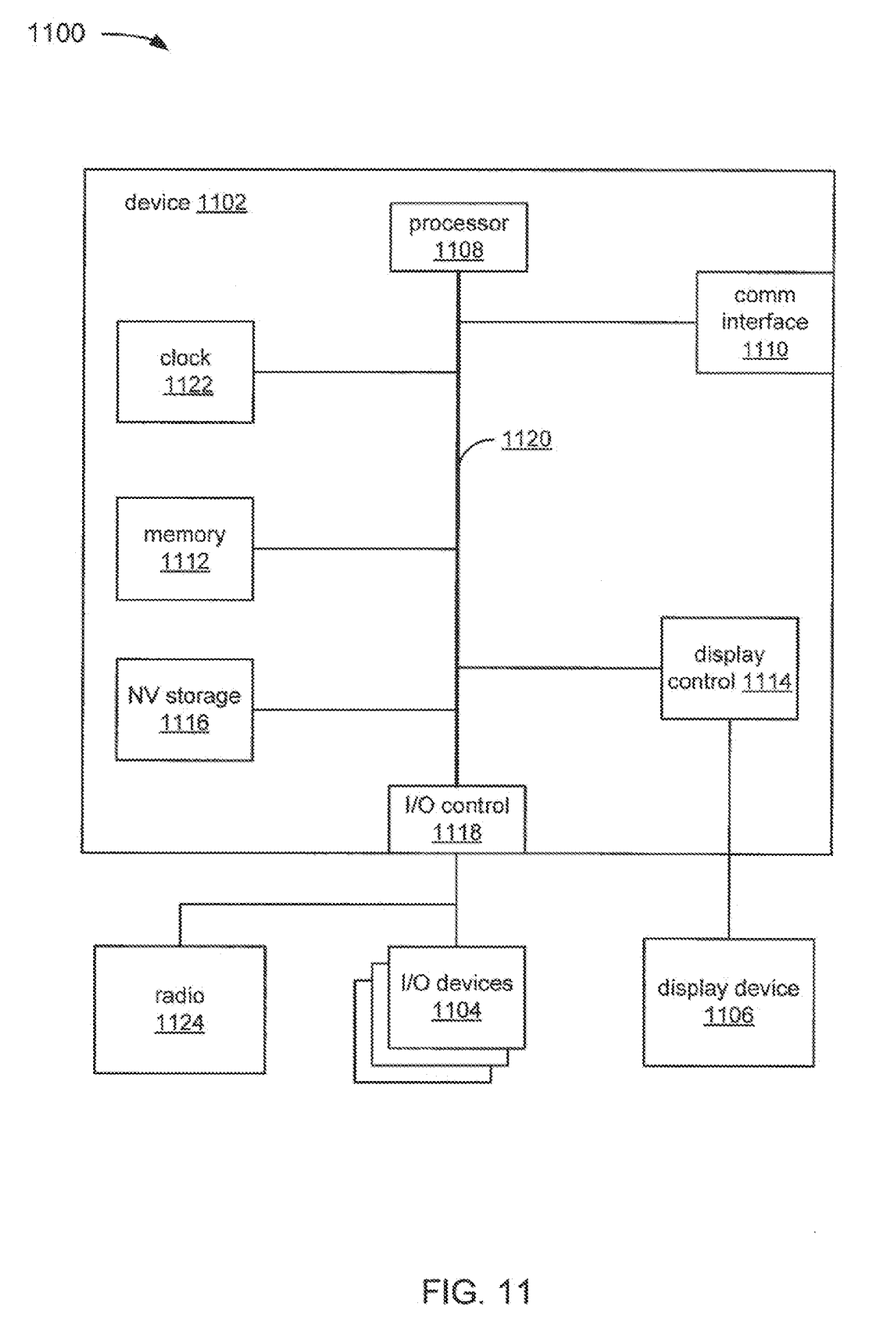
FIG. 11 depicts an example of a system representative of computing systems discussed herein, including various components.

FIG. 11 depicts an example of a system representative of computing systems discussed herein, including various components. The system 1100 may be a conventional computer system that can be used as a client computer system, such as a wireless client or a workstation, or a server computer system. The system 1100 includes a device 1102, I/O devices 1104, radio 1124 and a display device 1106. The device 1102 includes a processor 1108, a communications interface 1110, memory 1112, display controller 1114, non-volatile storage 1116, I/O controller 1118, clock 1122. The device 1102 may be coupled to or include the I/O devices 1104, the radio 1124, and the display device 1106.

The device 1102 interfaces to external systems through the communications interface 1110, which may include a modem or network interface. It will be appreciated that the communications interface 1110 can be considered to be part of the system 1100 or a part of the device 1102. The communications interface 1110 can be an analog modem, ISDN modem or terminal adapter, cable modem, token ring IEEE 1102.5 interface, Ethernet/IEEE 1102.3 interface, wireless 1102.11 interface, satellite transmission interface (e.g. "direct PC"), WiMAX/IEEE 1102.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 1108 may be, for example, a conventional microprocessor such as an Intel Pentium microprocessor or Motorola power PC microprocessor. The memory 1112 is coupled to the processor 1108 by a bus 1120. The memory 1112 can be Dynamic Random Access Memory (DRAM) and can also include Static RAM (SRAM). The bus 1120 couples the processor 1108 to the memory 1112, also to the non-volatile storage 1116, to the display controller 1114, and to the I/O controller 1118.

The I/O devices 1104 can include a keyboard, disk drives, printers, a scanner, and other input and output devices, including a mouse or other pointing device. The display controller 1114 may control in the conventional manner a display on the display device 1106, which can be, for example, a cathode ray tube (CRT) or liquid crystal display (LCD). The display controller 1114 and the I/O controller 1118 can be implemented with conventional well known technology.

The radio 1124 can include any combination of electronic components, for example, transistors, resistors and capacitors. The radio is operable to transmit and/or receive signals.

The non-volatile storage 1116 is often a magnetic hard disk, flash memory, an optical disk, or another form of storage for large amounts of data. Some of this data is often written, by a direct memory access process, into memory 1112 during execution of software in the device 1102. One of skill in the art will immediately recognize that the terms "machine-readable medium" or "computer-readable medium" includes any type of storage device that is accessible by the processor 1108.

Clock 1122 can be any kind of oscillating circuit creating an electrical signal with a precise frequency. In a non-limiting example, clock 1122 could be a crystal oscillator using the mechanical resonance of vibrating crystal to generate the electrical signal.

The system 1100 is one example of many possible computer systems which have different architectures. For example, personal computers based on an Intel microprocessor often have multiple buses, one of which can be an I/O bus for the peripherals and one that directly connects the processor 1108 and the memory 1112 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1112 for execution by the processor 1108. A Web TV system, which is known in the art, is also considered to be a computer system, but it may lack some of the features shown in FIG. 11, such as certain input or output devices. A typical computer system will usually include at least a processor, memory, and a bus coupling the memory to the processor.

In addition, the system 1100 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1116 and causes the processor 1108 to execute the various acts required by the operating system to input and output data and to store data in memory, including storing files on the non-volatile storage 1116.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

As used herein as a number, "e" refers Euler's number, the mathematical constant. While e is a real number, approximations of varying accuracy can be used for efficiency in calculations by one or more processing systems implementing the techniques disclosed herein. Approximation of calculations including Euler's number disclosed herein can be made by, e.g. an expression of a Taylor polynomial. Such an expression could be provided in integer calculations to avoid the need for floating point calculation hardware.

As used herein, a dynamic time window "τ" (tau) is a value of time at any convenient scale, e.g., nanoseconds or milliseconds. For a calculation of a single current output signal strength, τ is constant across one or more different sub-calculations of the current output signal strength value. τ can be dynamically adjusted between calculations of current output signal strength values.

As used herein, an "elapsed time value" is a value representing an amount of time that has passed between receipt of a first sample and receipt of a second sample. The value can be expressed in seconds, milliseconds, nanoseconds, or on any known or convenient time scale. The value can be represented as a number in a binary, base 10, or in another convenient numerical representation system.

What is claimed is:

1. A non-transitory processor-readable medium storing code representing instructions to be executed by a processor, the code comprising code to cause a processor to:
    define a weighted input signal strength value based on a signal strength value that is associated with an active channel of a source;
    define a decayed filter output value based on a first filter output value;
    send a signal indicative of a second filter output value to a memory, the second filter output value being a combination of the decayed filter output value and the weighted input signal strength value.

2. The non-transitory processor-readable medium of claim 1, wherein the signal strength value is a first signal strength value associated with a first signal received at a first time, the first filter output value is based on a second signal strength value associated with a second signal received at a second time prior to the first time.

3. The non-transitory processor-readable medium of claim 1, the code further comprising code to cause the processor to receive a dynamic time window value, the dynamic time window value being dynamically allocated as a factor of a weight applied to the current sample signal strength value and a factor of a weight applied to the previous output filter value.

4. The non-transitory processor-readable medium of claim 1, wherein the decayed filter output value is defined based on a time elapsed value and a dynamic time window value.

5. The non-transitory processor-readable medium of claim 4, wherein the time elapsed value is a difference between (1) a time associated with a first signal received at a first time and (2) a time associated with a second signal received at a second time prior to the first time.

6. The non-transitory processor-readable medium of claim 1, the code further comprising code to cause the processor to calculate a function expressed as a Taylor polynomial approximation and based on the signal strength value to define the weighted input signal strength value.

7. An apparatus, comprising:
    a filter configured to define a weighted signal strength value based on a signal strength value that is associated with an active channel of a source;
    the filter configured to define a decayed filter output value based on a first output value of the filter;
    the filter configured to send a signal indicative of a second output value of the filter to a memory, the second output value being a combination of the decayed filter output value and the weighted signal strength value.

8. The apparatus of claim 7, wherein signal strength value is associated with a first signal received at a first time, the first output value of the filter is based on a second signal received at a second time prior to the first time.

9. The apparatus of claim 7, wherein the signal strength value is associated with a first signal received at a first time, the filter is configured to obtain a dynamic time window value, the dynamic time window value being dynamically allocated as a factor of a weight applied to the first signal and a factor of a weight applied to a second signal received at a second time prior to the first time.

10. The apparatus of claim 7, wherein the decayed filter output value is based on a time elapsed value and a dynamic time window value.

11. The apparatus of claim 7, wherein the weighted signal strength value is based on a time elapsed value and a dynamic time window value.

12. The apparatus of claim 7, wherein the weighted signal strength is based on a function expressed as a Taylor polynomial approximation.

13. The apparatus of claim 7, wherein the filter configured to send a signal indicative of a third output value of the filter based on a third signal strength value and the current output signal strength value, the subsequent sample signal strength value based on a subsequent sample signal.

14. The apparatus of claim 7, wherein signal strength value is associated with a first signal received at a first time, the filter is configured to be coupled to a processor determining an elapsed time value by comparing (1) a first time value received from a clock when a second signal is received, the second signal received at a second time prior to the first time, with (2) a second time value received from the clock when the first signal was received.

15. A method, comprising:
  defining a decayed signal strength value based on (1) a first signal strength value that is associated with an active channel of a source and (2) a first function of a time elapsed value;
  defining a weighted signal strength value based on (1) a second signal strength value that is associated with the active channel of the source and (2) a second function of the time elapsed value; and
  sending a signal indicative of a output signal strength value to a memory, the output signal strength value based on a combination of the decayed signal strength value and the weighted signal strength value.

16. The method of claim 15, wherein the first function of the time elapsed value and the second function of the time elapsed value each include a ratio of the time elapsed value to a dynamic time constant value.

17. The method of claim 15, wherein the decayed signal strength value is based on a dynamic time window value.

18. The method of claim 15, wherein the time elapsed value is a difference between a first time associated with the second signal strength value and a second time associated with the first signal strength value.

19. The method of claim 15, wherein decayed signal strength value is a first decayed signal strength value and the output signal strength value is a first output signal strength value, further comprising:
  defining a second output signal strength value based on (1) a weighted signal strength value based on a third signal strength value and (2) a second decayed signal strength value based on the first output signal strength value.

20. The method of claim 15, wherein the first signal strength value is associated with a first signal received at a first time, and the second signal strength value is associated with a second signal received at a second time, after the first time.

* * * * *